Mar. 27, 1923.
L. A. GREEN
AUTO JACK AND LOCK
Filed Oct. 29, 1921
1,450,074
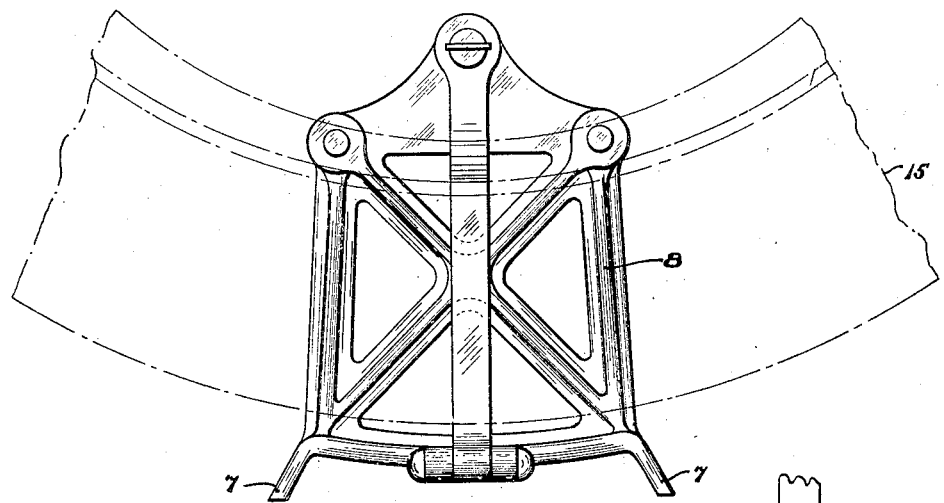
Fig. 1.
Fig. 4.
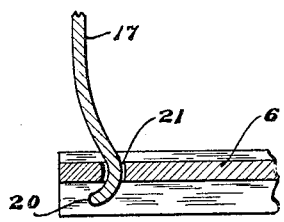
Fig. 3.
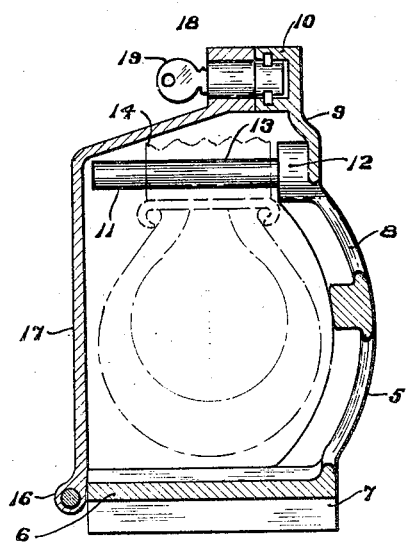
Fig. 2.
Lewis A. Green
INVENTOR
BY Victor J. Evans
ATTORNEY
WITNESS:

Patented Mar. 27, 1923.

1,450,074

UNITED STATES PATENT OFFICE.

LEWIS A. GREEN, OF PHILADELPHIA, PENNSYLVANIA.

AUTO JACK AND LOCK.

Application filed October 29, 1921. Serial No. 511,249.

*To all whom it may concern:*

Be it known that I, LEWIS A. GREEN, a citizen of the United States, residing at Philadelphia, in the county of Philadelphia and State of Pennsylvania, have invented new and useful Improvements in Auto Jacks and Locks, of which the following is a specification.

This invention relates to lifting jacks and it has more particular reference to jacks which are used for lifting a wheel or wheels of a motor vehicle from off the ground under its own power.

The primary object of my invention is to provide a combined jack and lock of the type referred to which may be readily and quickly attached to or detached from a vehicle wheel and which can be used for raising the vehicle without any appreciable effort on the part of the owner.

Another object of this invention is to provide a combined lifting jack and lock of the type referred to which when once applied to the wheel of an automobile for example, serves as a preventative against theft or unauthorized use of the machine to which it is applied.

A still further object of this invention is to provide a combined auto jack and lock which is of simple construction, cheap to manufacture and comprises but two main parts, said parts when assembled and in locked position being extremely effective for the purpose for which this invention has been devised.

With the foregoing and other objects in view as will be more apparent from the following description my invention consists essentially in the novel feature of construction, combination and arrangement of parts hereinafter fully described and more specifically defined by the appended claims.

In the further disclosure of the invention reference is to be had to the accompanying sheet of drawings constituting a part of this specification and in which like characters of reference designate the same or corresponding parts in all the views.

Figure 1 is a front elevation of my improved auto jack and lock with a fragmentary portion of an automobile wheel and tire shown therein in dot-and-dash lines.

Figure 2 is a vertical section taken at right angles to the preceding figure.

Figure 3 is a fragmentary detail of a slightly modified form of connecting the locking member with the base; and, Figure 4 is a front view of the preceding figure.

Referring more particularly to the views my invention comprises a main frame 5 of approximately L-shape in end view or transverse section, said frame including a curved base portion 6 having outwardly flared lateral ribs or supporting feet 7. The vertical portion 8 of the aforesaid frame is of cruciform pattern as will be clearly understood from Figure 1 and it is provided at its upper part with a web or extension 9 having a laterally projecting boss or projection 10 for a purpose later on explained. Appropriately mounted within the frame 5 are a pair of spaced rods 11 conveniently attached to bosses 12 on the inside of said frame or these rods or lateral arms 11 may be integrally formed with the frame and it is to be particularly noted that in use these rods 11 are passed through holes 13 provided for their reception in the felly 14 of the vehicle wheel 15. Now it will be clearly understood that when the rods 11 are projected into the holes 13 aforesaid and the wheel is turned the base ribs or supporting feet 7 will impinge the surface of the ground or other place where the vehicle may be located and will effectively raise or lift that side of the vehicle on which the device is applied from contact with the ground.

In order to provide an effective means for locking the jack to the wheel 15 I hinge at 16 to the lower inner part of the base 6 a strap member 17 of substantially the shape indicated in Figure 2, said strap member being adapted to be folded up as shown and locked by a lock 18 to the aforesaid boss 10, said lock being provided with a removable key 19 as will be obvious to those acquainted with the art to which this invention appertains.

Instead of the strap member 17 being hinged to the base 6 as above described I may form the same with a rounded end 20 as shown in Figures 3 and 4 for passage through a slot 21 provided for the purpose in the aforesaid curved base 6, this form of the invention providing a very neat and compact device.

From the foregoing description and an examination of the drawings it will be clearly seen that when it is desired to lift up any part of the vehicle the jack is applied as hereinbefore set forth by slipping the rods 11 into the holes 13 and permitting the wheel to be turned under its own power or to swing down until the ribs or supporting feet 7 engage the ground or floor upon which the vehicle stands when a slight pressure in either direction will result in the vehicle being slightly raised, whilst the frame 5 will assume and maintain a rigid and vertical disposition. When desired the application of the strap member 17 will result in the effective locking of the device whereas on the other hand it will likewise be seen that my device will be found extremely useful when it is desired to remove wheel tires or rims.

Still further it will be noted that if four such devices as have been hereinbefore described are applied to the four wheels of a motor vehicle the same may be effectively raised so that the load thereof is entirely taken up from off the tires.

Another advantage accruing to my invention is its ready applicability as a mud hook or in other words an efficient means for raising a car out of a rut or other difficult location.

Whilst I have described and shown the best form of the invention at present known to me the same is not to be construed as conclusive in that it will be perfectly obvious that changes in the shape or pattern of the parts can be effected without departing from the spirit and essential features thereof, such changes or variations however being limited by the scope of the appended claims.

Having described my invention, what I claim as new and desire to secure by Letters Patent is:

1. A combined auto jack and lock for vehicles comprising a main frame of angular cross section the basal portion whereof is longitudinally grooved to conform to the peripheral contour of a vehicle wheel and a vertical portion being of enclosed cruciform pattern, outwardly flared supporting feet beneath the basal portion, laterally disposed rods projecting from the aforesaid vertical portion for insertion in correspondingly shaped holes in a wheel felly, and a strap having co-operative connection with the aforesaid base and adapted for locking engagement over the wheel rim into the upper part of the vertical portion of the main frame.

2. A combined auto jack and lock for vehicles comprising a main frame of angular cross section the basal portion whereof is longitudinally grooved to conform to the peripheral contour of a vehicle wheel and a vertical portion being of enclosed cruciform pattern, outwardly flared supporting feet beneath the basal portion, laterally disposed rods projecting from the aforesaid vertical portion for insertion in correspondingly shaped holes in a wheel felly, and a strap hingedly connected to the inner edge of the base portion, said strap being adapted for locking connection over a wheel rim into the upper part of the aforesaid vertical portion.

In testimony whereof I affix my signature.

LEWIS A. GREEN.